Feb. 9, 1932.  A. PICCO  1,844,043

SPRING CUSHION INCLOSING SHOCK ABSORBING MEANS

Filed March 27, 1930

Inventor,
Alfredo Picco

Patented Feb. 9, 1932

1,844,043

UNITED STATES PATENT OFFICE

ALFREDO PICCO, OF TURIN, ITALY

SPRING CUSHION INCLOSING SHOCK ABSORBING MEANS

Application filed March 27, 1930, Serial No. 439,423, and in Italy March 29, 1929.

This invention relates to a spring cushion, more particularly for vehicle seats, comprising means for improving the passengers' comfort during drive.

The object of this invention is to provide a spring cushion having means for damping the recoil of the spring members tending to increase the width of the displacements to which the passenger is subjected owing to the shocks suffered by the vehicle when driving over uneven roads.

A further object of this invention is to provide a cushion of the above mentioned type which is cheap in manufacture and reliable in working.

The accompanying drawings show by way of example a construction of the cushion according to this invention.

Figure 1:
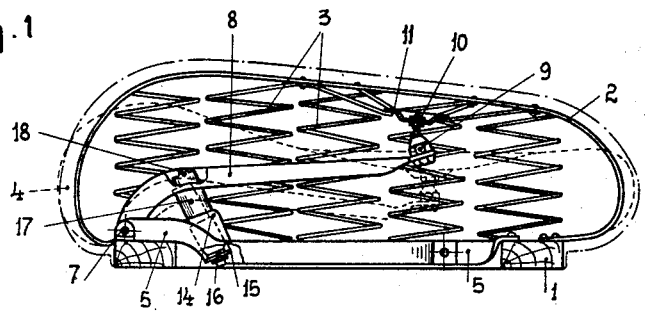
Figure 1 is a cross section through the cushion.
Figure 2:
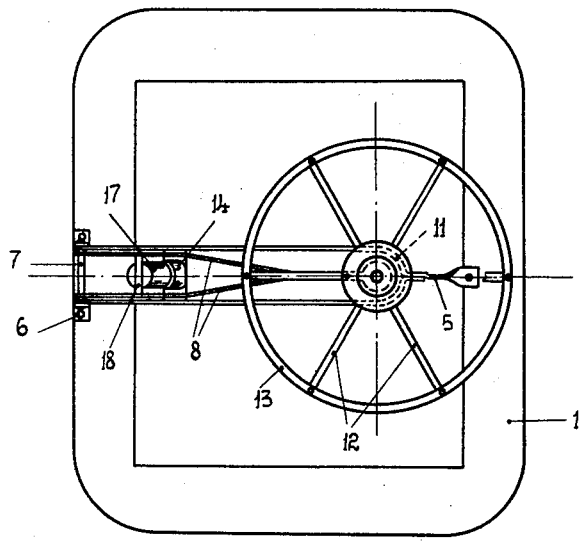
Figure 2 is a plan vew of the shock absorbing device and the mounting therefor and Figure 3 is a plan view of the cushion without its upholstery.
Figure 3:
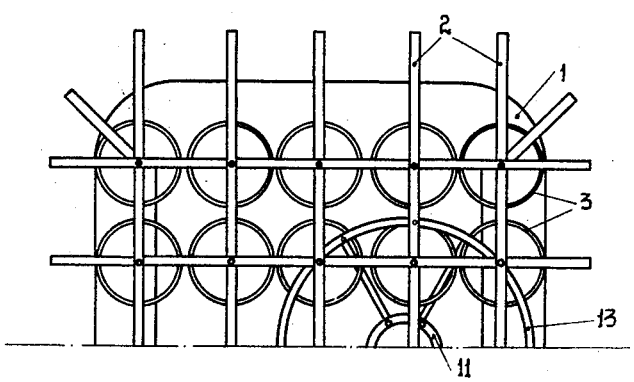

Referring to the drawings, I place on a bottom 1, comprising a frame and a nonillustrated network of spring leaves, the spring device consisting of a network of leaf springs 2 curved according to the cushion profile and of rows of spiral springs 3 interposed between the bottom and said leaf springs. On the spring device I place in the usual manner a layer of upholstery material 4.

A cross bar 5, lying on the longitudinal cushion axis, is secured to the bottom and is bifurcated, the ends of its branches being supported by a bracket 6 secured to the rear side of the frame.

A bifurcated arm 8 is also pivoted to said bracket and carries at its front end a socket 9 of a ball and socket joint, the ball 10 whereof is fixed to a disk 11 connected by a sheet metal spider 12 to a ring 13 fixed to the lower face of the crossed leaf springs 2.

A hydraulic shock absorber is placed between the fork and swing arm near the rear ends thereof, the shock absorber element 14 being connected to and capable of oscillating with the interposition of a resilient washer 15 on a plate 16 fixed to the branches of the cross bar 5, while the other element 17 of the shock absorber is pivoted to a pivot 18 carried by the branches of the arm 8.

The shock absorber is preferably of the hydraulic telescopic type and is adapted to damp the recoil only of the cushion spring device.

Figure 1 shows in dotted lines the position taken by the cushion when it undergoes a deformation under the action of a considerably strong shock and the shock absorber position corresponding to this deformation. The cushion recoil to the normal position is damped by the shock absorber, so that the passenger sitting on the cushion does not suffer the wide shocks which are unavoidable in the absence of a shock absorber.

The improved cushion according to this invention is more particularly suitable for the vehicle driver who is thus in a position to drive the car undisturbed by the shocks.

What I claim is:

1. In a cushion, in combination, a bottom, a network of spring leaves fixed to the bottom and curved according to the cushion profile, a longitudinal cross bar axially secured to the frame, a swing arm pivoted to the rear end of said cross bar and connected at its front end to the lower face of said network and a shock absorber mounted between said cross bar and swing arm so as to damp the recoil of the spring leaves.

2. In a cushion, in combination, a bottom, a network of spring leaves fixed to the bottom and curved according to the cushion profile, a plurality of spiral springs interp sed between the bed frame and the network, a longitudinal bifurcated cross bar axially secured to said bottom, a bifurcated swing arm pivoted to the rear end of said cross bar and connected in front by a ball and socket joint to the lower face of said network and a hydraulic shock absorber situated between the branches of said cross bar and swing arm for damping the recoil of said network and spiral springs.

In testimony that I claim the foregoing as my invention, I have signed my name.

ALFREDO PICCO.